No. 848,508. PATENTED MAR. 26, 1907.
C. F. THOMAS & E. SCHMITT.
COMBINED SHOVEL SCRAPER AND DUMP WAGON.
APPLICATION FILED JAN. 26, 1907.
4 SHEETS—SHEET 1.
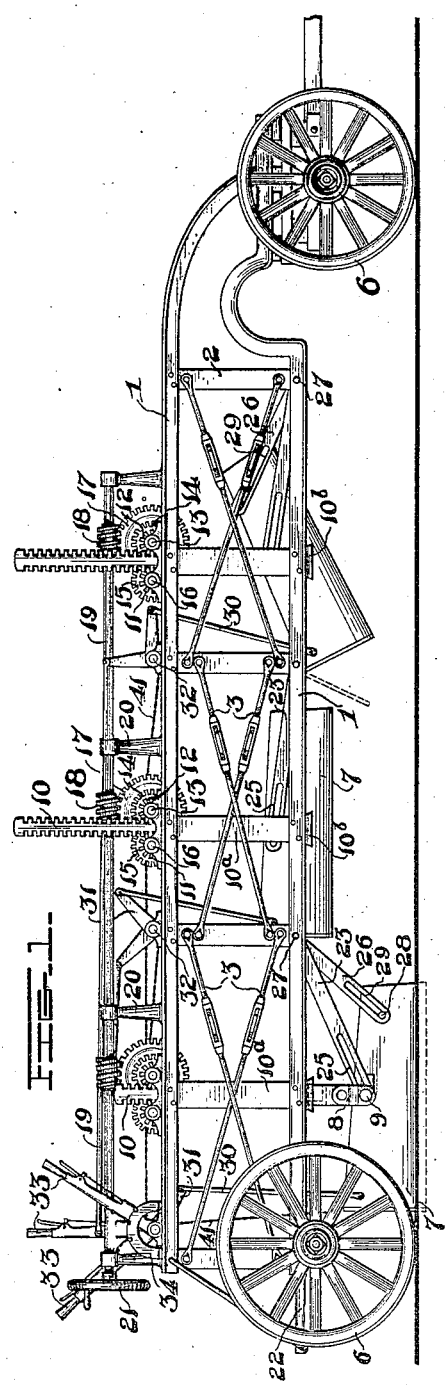

No. 848,508. PATENTED MAR. 26, 1907.
C. F. THOMAS & E. SCHMITT.
COMBINED SHOVEL SCRAPER AND DUMP WAGON.
APPLICATION FILED JAN. 26, 1907.
4 SHEETS—SHEET 2.
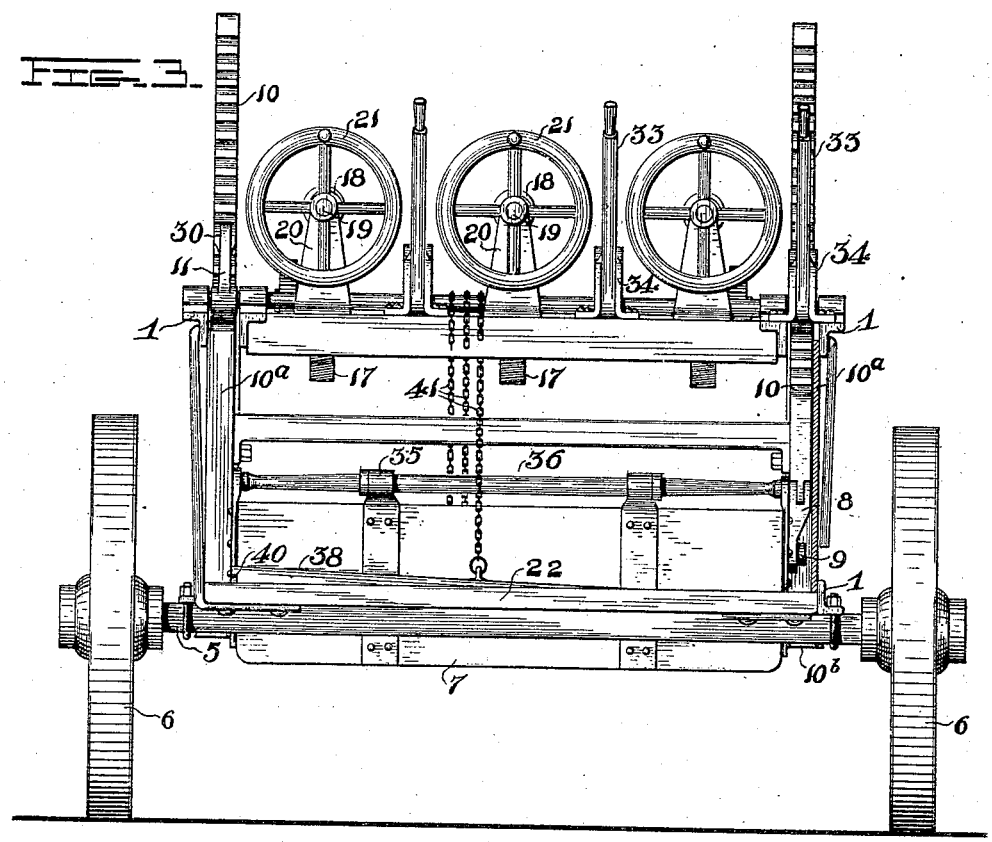
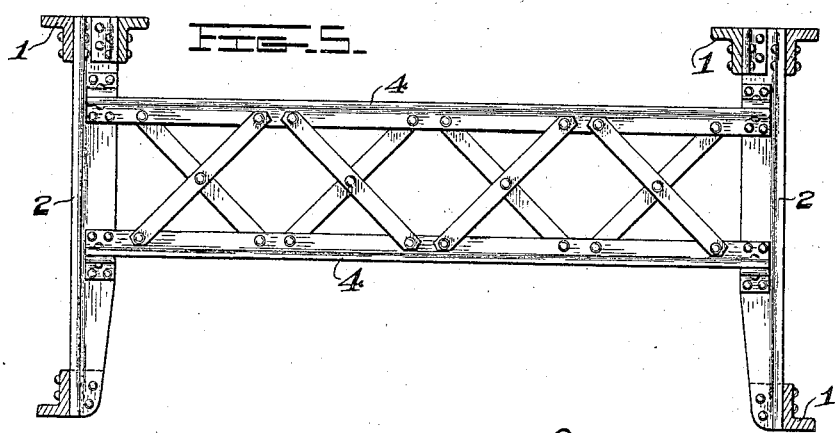

No. 848,508. PATENTED MAR. 26, 1907.
C. F. THOMAS & E. SCHMITT.
COMBINED SHOVEL SCRAPER AND DUMP WAGON.
APPLICATION FILED JAN. 26, 1907.
4 SHEETS—SHEET 3.
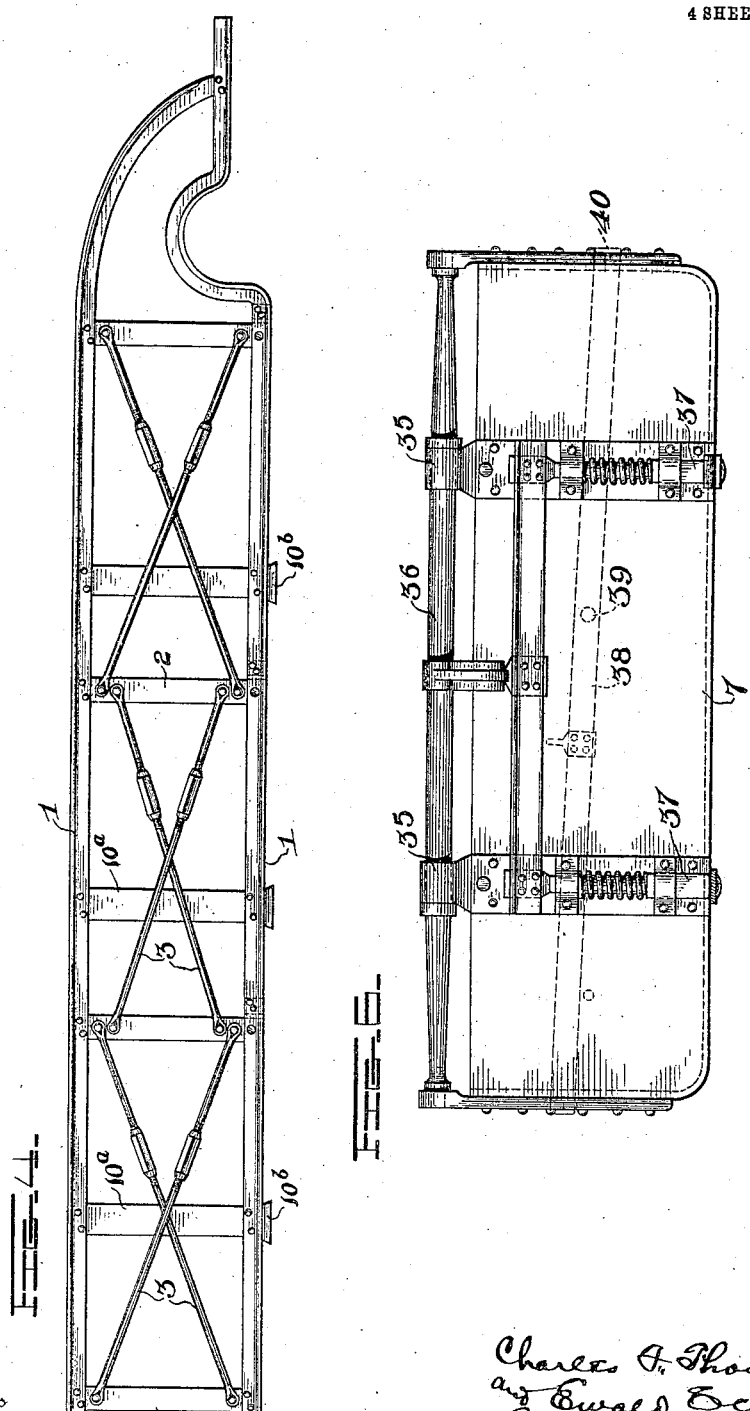

No. 848,508. PATENTED MAR. 26, 1907.
C. F. THOMAS & E. SCHMITT.
COMBINED SHOVEL SCRAPER AND DUMP WAGON.
APPLICATION FILED JAN. 26, 1907.
4 SHEETS—SHEET 4.
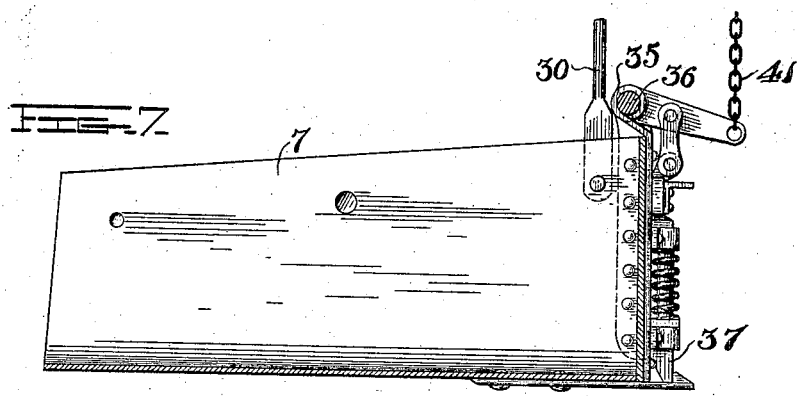
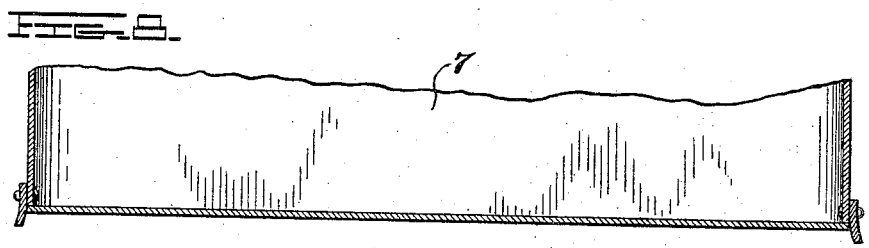
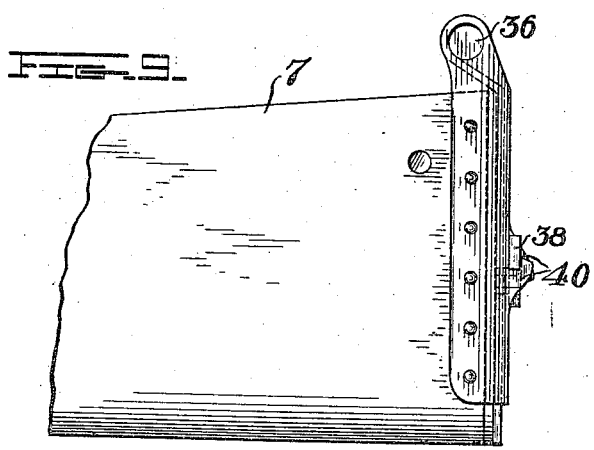

UNITED STATES PATENT OFFICE.

CHARLES F. THOMAS, OF BUCKEYSTOWN, MARYLAND, AND EWALD SCHMITT, OF WASHINGTON, DISTRICT OF COLUMBIA.

COMBINED SHOVEL-SCRAPER AND DUMP-WAGON.

No. 848,508.     Specification of Letters Patent.     Patented March 26, 1907.

Application filed January 26, 1907. Serial No. 354,338.

*To all whom it may concern:*

Be it known that we, CHARLES F. THOMAS and EWALD SCHMITT, citizens of the United States, residing at Buckeystown, in the county of Frederick and State of Maryland, and Washington, in the District of Columbia, respectively, have invented certain new and useful Improvements in a Combined Shovel-Scraper and Dump-Wagon, of which the following is a specification.

Our invention relates to an improvement in combined shovel-scrapers and dump-wagons, and the purpose is to combine and unite in a single machine mechanism for performing the ordinary functions of a scraper, together with the usually independent functions of a dump-wagon.

In other words, the present invention contemplates a machine not only for scraping up the dirt and loading itself, but also one which may be used for long or short hauls over rough or smooth roads in the handling of loose earth, sand, gravel, broken stone, &c., for scraping, dredging, or conveying purposes both on land or even under water.

With the foregoing objects in view our invention consists in a suitably-braced frame or superstructure mounted on wheels and carrying one or more pivotally-hung and adjustably-supported scrapers capable of being tilted, raised, lowered, and dumped from a common central point, where one or all are under the management of a single operator.

Our invention still further consists in certain novel features of construction and combinations of parts, which will be hereinafter described, and pointed out in the claims.

In the accompanying drawings, Figure 1 is a view of our improved machine in side elevation. Fig. 2 is a plan view. Fig. 3 is a rear elevation. Fig. 4 is a detail view of one side of the frame. Fig. 5 is a view in cross-section showing the preferred bracing of the frame. Fig. 6 is a rear view, somewhat enlarged, of one of the scrapers. Fig. 7 is a longitudinal section through the same. Fig. 8 is a fragmentary horizontal section. Fig. 9 is a detail view from one side of the rear end of the scraper.

The frame may of course be variously constructed, but preferably consists of angle-iron girders 1 1, extending throughout the length of the machine. These are held at suitable distances apart by means of the vertical bars 2 2, placed at the required intervals apart and held rigid by the extensible cross-braces 3 3. Across from one side of the frame to the other the brace-beams 4 4 extend.

The foregoing constitute the main features of the frame or superstructure, and the same is mounted by means of axles 5 5 on wheels 6 6 in the usual manner. One or more scraper-shovels 7 7 may be employed. In the drawings we have shown three of them, although even more or less than this number might be employed. These scraper-shovels are all substantially alike and designed to scrape and carry the same amount of dirt. They are suspended at either side by means of links 8 8, pivoted at their lower ends on the centrally-located studs 9 9 on the sides of the scraper-shovels, and at their upper ends these links are pivotally connected to the double rack-bars 10 10, and the latter are guided at their sides through guide-channels $10^a$, having the bell-mouths $10^b$ at their lower ends in their vertical movements between the two upper girders 1 1 of the main frame and in front and rear by the gears 11 and 12, the teeth of which engage the front and rear racks, whereby the latter are raised and lowered. The gears 12 are keyed to the opposite ends of the transverse shafts 13 13, and these shafts 13 13 are provided with pinions 14 14, which mesh with pinions 15 15 on stub-shafts 16 16, which carry the gears 11 11, whereby motion is communicated to the latter. A worm-gear 17 on each transverse shaft 13 is engaged by a worm 18 on the worm-shaft 19, which latter are carried to the rear and journaled in bearings 20 and provided with a crank-wheel 21 at a point over the platform 22, where the operator stands and controls these various mechanisms.

In addition to the means for raising and lowering the scraper-shovels just described each scraper-shovel is preferably provided with two bars, a main draw-bar 23, which extends from pins 27 on the lower girders 1 1 of the frame, and the studs 9 on either side of each scraper-shovel, where they are provided with elongated slots 25, which permits sliding movement at this point. The secondary draw-bars 26 are similarly pivoted on pins 27 at their forward ends to the frame and studs 28 at their rear or lower ends on the sides of the shovels, the elongated slots 29 29 being provided to allow for sliding movement relative thereto. These draw-bars sustain the pulling strain of the shovels during the scraping or scooping operation of the machine, they holding the shovels to their work while the scraping or scooping takes place and turning readily to an approximately horizontal position when the shovel is elevated, as shown at the center of Fig. 1.

The foregoing explains the elevating and the draft mechanism. The tilting of the shovels is accomplished through the tilting rods 30 30, which are pivotally connected at their lower ends to the rear ends of the shovels and at their upper ends to the bell-crank levers 31, which latter are fulcrumed on a suitable cross-rod 32 and provided with latch-levers 33, which operate in connection with the notched segments 34 after the usual manner of such mechanism, these levers 31 being located within reach of the operator at the rear of the machine, so that the tilting is within his control. The shovels thus may be variously constructed and at their rear ends are preferably provided with hinged plates 35 35, which are hinged at their upper ends to the cross-rod 36. These hinged plates are heavy enough to close and lock by gravity, the spring-bolts 37 37 being provided for that purpose, or the gravity latch-bar 38, as preferred, the latter when it is used being eccentrically pivoted at 39, so that it drops in locking position by gravity to engage the catches 40 40 at the sides of the shovel. These spring-bolts, if used, or the latch-bar are controlled by chains 41 41, running over pulleys 42 42 to a point within reach of the operator at the rear of the machine.

The team is hitched to the forward end and the machine is drawn along and the operator first lowers one shovel and then another, tilting one shovel and filling it, after which it is elevated to the carrying position, and then another is lowered, filled, and raised, and when it is desired to dump its contents the bell-crank lever is tilted to turn the shovel into the position shown at the forward end of Fig. 1, the back plate being unlatched and allowed to open, as indicated in dotted lines, after which the parts are returned to their normal position. In this way the machine is provided not only for scooping the dirt, sand, or other material, but also for carrying it a long or short distance, as may be desired.

It is evident that more or less slight changes might be resorted to in the form and arrangement of the several parts described without departing from the spirit and scope of our invention, and hence we do not wish to limit ourselves to the exact construction herein set forth; but, Having fully described our invention, what we claim as new, and desire to secure by Letters Patent, is—

1. In a combined shovel-scraper and dump-wagon, the combination with a suitable frame, of a scraper-shovel, and means for raising, lowering, tilting and opening the rear of the shovel from a single station on the machine.

2. In a combined shovel-scraper and dump-wagon, the combination with a suitable frame of a plurality of scrapers supported by the frame, and means located at the rear within reach of the operator for raising, lowering and tilting the scraper-shovels and for opening and closing the rear ends thereof for dumping the contents.

3. In a combined shovel-scraper and dump-wagon, the combination with a suitable frame, of a scraper-shovel, rack-bars having vertical sliding connection with the frame, to the lower ends of which the shovels are suspended and two sets of draw-bars having pivotal connection with the frame, and pivotal sliding connection with the shovel at different points.

4. In a combined shovel-scraper and dump-wagon, the combination with a suitable frame, of a scraper-shovel, rack-bars having vertical sliding connection with the frame, to the lower ends of which the shovels are suspended and two sets of draw-bars having pivotal connection with the frame, and pivotal sliding connection with the shovel at different points and means for tilting the shovel.

5. In a combined shovel-scraper and dump-wagon, the combination with a suitable frame, of a scraper-shovel, rack-bars having vertical sliding connection with the frame, to the lower ends of which the shovels are suspended and two sets of draw-bars having pivotal connection with the frame, and pivotal sliding connection with the shovel at different points, and guide-channels in which the rack-bars slide up and down.

6. In a combined shovel-scraper and dump-wagon, the combination with a suitable frame, of a scraper-shovel, rack-bars having vertical sliding connection with the frame, links pivoted to the lower ends of the rack-bars and to which the shovels are suspended and two sets of draw-bars having pivotal connection with the frame and pivotal sliding connection with the shovel at different points and guide-channels in which the rack-bars slide up and down, having bell-mouthed openings at their lower ends.

7. In a combined shovel-scraper and dump-wagon, the combination with a suitable frame, of a scraper-shovel and double rack-bar to the lower end of which the shovel is suspended, pinions intermeshing with the teeth on both sides of said rack, a shaft and stub-shaft carrying said pinions, and gear-wheels secured on said shafts for transmitting motion from one to the other.

8. In a combined shovel-scraper and dump-wagon, the combination with a suitable frame, of a scraper-shovel and double rack-bar to the lower end of which the shovel is suspended, pinions intermeshing with the teeth on both sides of said rack, a shaft and stub-shaft carrying said pinions, gear-wheels secured on said shafts for transmitting motion from one to the other, a worm-gear on the shaft, a worm engaging said gear and a shaft on which the worm is located extending to a point within easy reach of the operator.

9. In a combined shovel-scraper and dump-wagon, the combination with a suitable frame, of a scraper-shovel vertically-movable rack-bars to which the shovel is pivotally suspended, a tilting rod connected with the shovel and means extending to a common point on the machine for raising and lowering the racks and the tilting rod.

10. In a combined shovel-scraper and dump-wagon, the combination with a suitable frame, of a scraper-shovel suspended therefrom, means for raising, lowering and tilting said shovel, a plate hinged to the rear and a latch for automatically closing said plate when the shovel is placed in its normal position.

11. In a combined shovel-scraper and dump-wagon, the combination with a suitable frame, of a scraper-shovel suspended therefrom, means for raising, lowering and tilting said shovel, a plate hinged to the rear, a latch for automatically closing said plate when the shovel is placed in its normal position, and means extending within reach of the operator for opening said plate when the shovel is tilted to the dumping position.

In testimony whereof we have signed our names to this specification in the presence of the subscribing witnesses.

CHARLES F. THOMAS.
EWALD SCHMITT.

Witnesses:
  GEO. E. TERRY,
  VERNON E. HODGES,
  ROLAND C. BOOTH,
  LLOYD PATCH.